3,619,897
ARRANGEMENT FOR A WELDED TUBE
FORMING MACHINE
Wilhelm Oppermann, Duisburg, and Johann Vogt, Duisburg-Wanheimerort, Germany, assignors to Demag Aktiengesellschaft, Duisburg, Germany
Filed Mar. 13, 1970, Ser. No. 19,157
Claims priority, application Germany, Apr. 24, 1969,
P 19 20 871.0
Int. Cl. B23k 31/02
U.S. Cl. 29—475
6 Claims

ABSTRACT OF THE DISCLOSURE

An arrangement for a welded tube forming machine includes a straight trackway forming a center point at one location for a curved trackway. The curved trackway is adapted to carry the necessary equipment for preparing strip material for forming it into a tube. This equipment may be moved on the curved trackway through an arc so that its longitudinal center line may be aligned with the longitudinal center line of tube finishing equipment, or arranged at a selected angle in respect thereto. The straight trackway provides means for shifting forming equipment for preparing helical seam tubes and forming equipment for forming longitudinal-seam tubes. The arrangement and construction as such that the strip preparing equipment may be located so that its longitudinal center line aligns with the longitudinal center line of the tube-finishing apparatus and in such instance the forming equipment for the longitudinal seam welding is interposed on the trackway at a location between the strip preparing equipment and the tube finishing equipment. When helical seam tubes are to be welded, then the strip preparing equipment is arranged at a selected angle in respect to the longitudinal center line of the tube finishing equipment and the forming equipment is shifted on the trackway until the forming equipment for preparing helical seam tubes is located between the strip preparing and tube finishing equipment, that is at a location to receive the strip material which has been prepared for the formation of the helical welding seam and then for delivering it, after welding, to the tube finishing equipment.

SUMMARY OF THE INVENTION

This invention relates in general to the arrangement of welding equipment and in particular to a new and useful layout and arrangement for adjustably mounting the set of equipment for preparing strip material to be formed into tubes in respect to the set of the tube finishing equipment and for also interposing, selectively, means for forming a tube with a helical seam or means for forming a tube with a longitudinal seam between the two sets of equipment.

The invention relates to the arrangement of equipment for the continuous production of welded sheet steel tubes or of non-ferrous tubes of strip material or sheet material using a strip preparing part and a tube finishing part. For this purpose such tubes are produced in longitudinal or helical tube welding equipment. Both systems have their specific advantages. The advantage of the longitudinal seam welding is primarily that the length of the welding seam equals the tube length and accordingly the welding speed corresponds to the tube output speed. Helical seam welding equipment offers the advantage that various tubes diameters can be produced with one initial width of strip raw material. Furthermore the investment costs and the space requirements are far less than for equivalent longitudinal seam welding equipment. The strip material must be fed into the forming part of the spiral seam welding equipment under a certain forming angle, otherwise, the welding seam will be considerably longer than the tube length and the tube output speed will be slower than the welding speed. Heretofore, it was necessary to employ two completely separate machines for the production of longitudinally and helically welded tubes in order to realize the basic different production methods of each system. This duel equipment is naturally very expensive and requires much space for its installation.

In accordance with the invention, there is provided an arrangement in which the strip preparing equipment and the tube finishing equipment may be oriented selectively in respect to either equipment for preparing helical seam tubes or equipment for preparing longitudinal seam tubes. With such an arrangement only one machine is needed for both types of tubes because the strip preparing part and the tube finishing part are identical for both kinds of tubes. It is only the forming part which is located between these two parts which is different.

In accordance with the principal feature of the invention, the strip preparing part of the equipment is mounted so as to be pivotable on a pivot track having a center line which lies on a transverse track which is arranged at right angles to the longitudinal axis of the tube finishing equipment. The transverse track provides a trackway for forming equipment for preparing helical seam tubes and also for forming equipment for preparing longitudinal seam tubes and this equipment may be shifted along the trackway in order to interpose them selectively at the intersection of the strip preparing part and the tube finishing part. Thus in accordance with which type of tube welding is to take place one or the other of the helical seam welding or longitudinal seam welding equipment is positioned at the intersection of the strip preparing part and the tube finishing part. The advantage of the invention therefore, is that either longitudinal or helical welded steel of non-ferrous tubes can be produced in one in the same overall arrangement and with the least space requirement and therefor the range of tube production is enlarged.

Accordingly, it is an object of the invention to provide an arrangement for selectively forming tubes with either longitudinal or helical seams which includes the mounting of the strip preparing portion of the equipment on a trackway to permit it to be shifted to move its axis through an arc which intersects the axis of the tube finishing portion of the equipment and which also intersects a trackway which is arranged transversely to the tube finishing portion, and wherein the equipment for preparing helical seam welded tubes and longitudinal seam welded tubes is mounted on the trackway so that it can be shifted to position it selectively between the strip preparing part and tube finishing part with these latter two parts being arranged at the correct angle in relation to each other in accordance with which type of tube is to be formed.

A further object of the invention is to provide equipment for forming tubes which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figure 1:
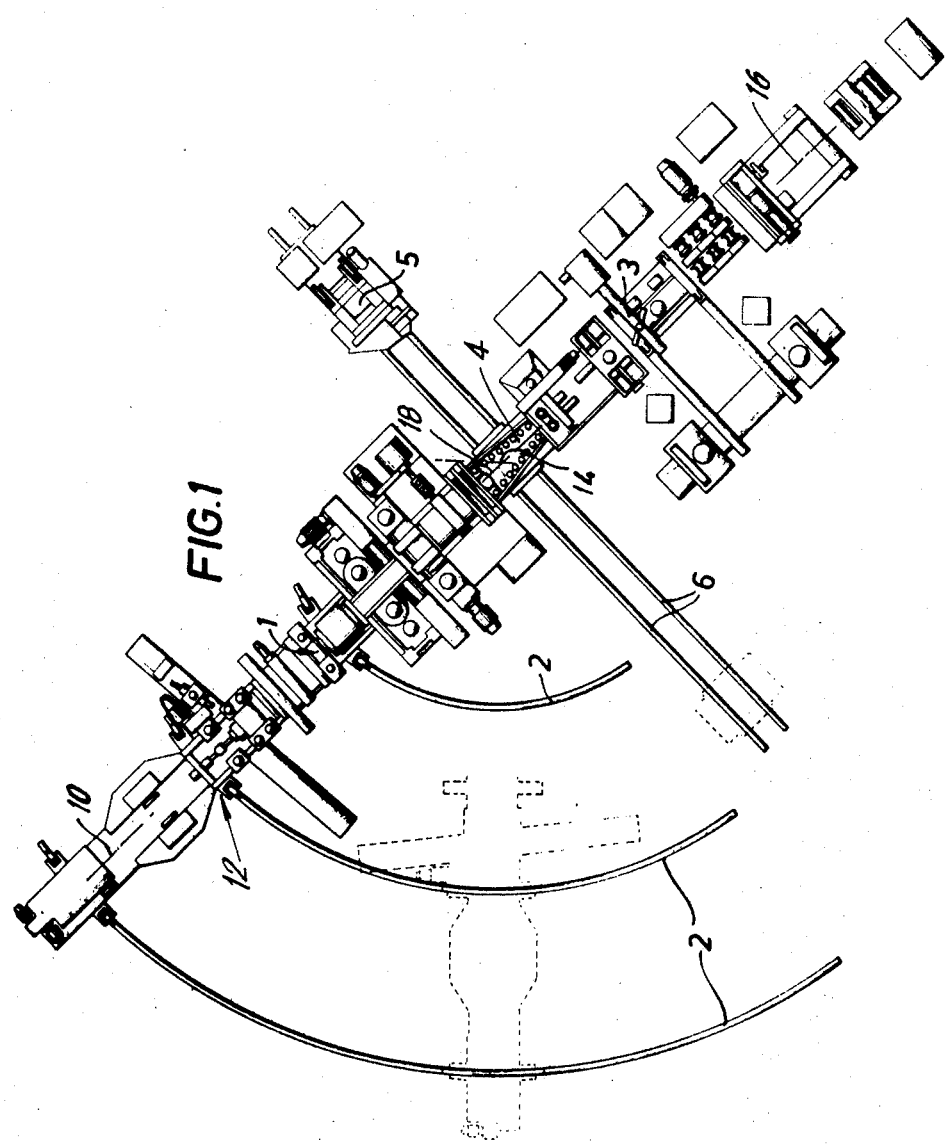
FIG. 1 is a schematic top plan view of welding equipment constructed in accordance with the invention.

Referring to the drawings in particular, the invention embodied therein comprises a strip material preparing part generally designated 1 comprising a plurality of individual devices arranged along a longitudinal feed line 10 and carried on support means generally designated 12 which is adapted to move over an arcuate trackway 2 which has a center of curvature which intersects the longitudinal feed line 10 at a location 14. The strip preparing part is composed of substantially standard mechanism and apparatus for forming a strip of sheet material to the necessary dimensions and size for forming it into a tube. The apparatus also includes a tube finishing device or tube finishing equipment 3 which is arranged for feeding the tube along a feed line having a longitudinal center line 16.

In accordance with the invention, in addition, to the arrangement of the strip preparing part 1 so that it may be shifted on the trackway 2 through an arc having its center at the point 14, the tube forming apparatus of the invention also includes a trackway 6 which extends normal to the longitudinal feed line 16 which is advantageously oriented in a fixed location. The trackway 6 provides means for shifting a forming part generally designated 4 for forming longitudinal seam tubes and a forming part 5 for forming helical seam tubes.

Method of operation

When a tube is to be formed with a longitudinal welded seam, the equipment is arranged according to FIG. 1 with the strip preparing part located so that its longitudinal center line 10 is aligned with the longitudinal center line 16 of the tube finishing portion. The forming equipment 5 for preparing helical seam tubes is moved along the trackway out of position and the forming equipment 4 for forming longitudinal seam tubes is oriented so that its center line 18 coincides with the center lines 10 and 16. The equipment thus arranged will permit the formation of tubes with longitudinally welded seams.

Figure 2:
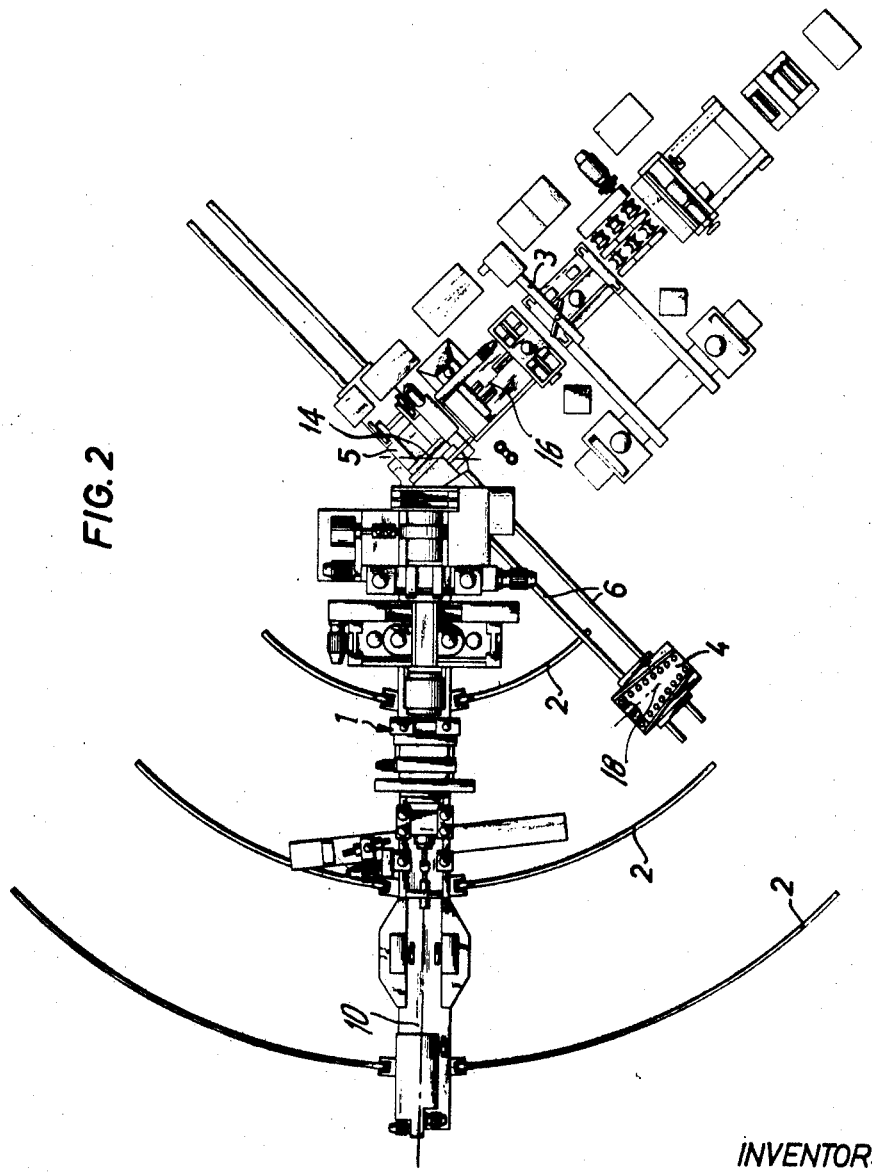
FIG. 2 is a top plan view similar to FIG. 1 but with the equipment oriented for forming a helical seam tube.

When it is intended to produce tubes having helically welded seams, the forming part 4 is shifted out of position, for example to the non-used position indicated in FIG. 2, and the strip preparing part 4 is shifted on its trackway 2 to the dotted line position indicated in FIG. 1 and to the solid line position indicated in FIG. 2. Thereafter the forming part 5 for forming helical seam tubes is positioned in the solid line position indicated in FIG. 2 in which it interconnects the strip preparing part 1 with the tube finishing part 3. In the position of FIG. 2, the parts are therefore oriented for the continuous production of tubes with helical seams. Naturally the respective strips must be fed into the strip preparing part 1 by means not indicated.

The invention ensures that the range of production for both types of tubes may be materially enlarged. The production range for helical seam tube production with respect to strip width has been:

maximum tube diameter equals strip width
minimum tube diameter equals one-half strip width.

The above range is increased by the equipment combination proposed according to the invention when longitudinal seam forming is used to:

minimum tube diameter ($d$) equals the strip width ($w$) divided by $$\pi \cdot \left( d - \frac{w}{\pi} \right)$$

What is claimed is:

1. Equipment for the continuous production of welded steel tubes from strip material, comprising a strip preparing part including means for preparing strip material for forming it into a tube, a tube finishing part having means for finishing the tube which has been formed, each of said strip preparing and tube finishing parts having longitudinal feed lines, means mounting said strip preparing part and said tube finishing part to permit relative shifting angular movement of said longitudinal feed lines of one part in respect to the other, an exchangeable tube forming part for forming tubes with longitudinal welding seams, an exchangeable tube forming part for forming tubes with helical welding seams, and means for transporting said exchangeable tube forming parts for selective positioning thereof between said strip preparing part and said tube finishing part in accordance with whether tubes with longitudinal seams or helical seams are to be formed.

2. Equipment, according to claim 1, wherein said means mounting said strip preparing part and said tube finishing part to permit shifting movement of the center lines thereof in respect to each other includes an arcuate trackway for said strip preparing part, said strip preparing part being mounted so that its longitudinal feed line may be shifted arcuately in respect to said trackway in respect to the longitudinal feed line of said tube finishing part.

3. Equipment, according to claim 2, including track means extending transversely to the longitudinal feed line of said tube finishing part and means mounting said forming part for forming longitudinal seam tubes and said forming part for forming helical seam tubes for movement along said trackway.

4. Equipment, according to claim 1, including a trackway extending transversely in respect to said longitudinal feed line of said tube finishing part, a curved trackway having its radius of curvatures centered on said transverse trackway at the intersection of said longitudinal feed line of said tube finishing part, said strip preparing part for the positioning of the longitudinal feed line of said strip preparing part at a selected angle in respect to the longitudinal feed line of said tube finishing part, said forming part for forming tubes with a longitudinal seam and said forming part for forming a tube with a helical seam being mounted on said transverse trackway for shiftable movement therealong.

5. A method for the continuous production of welded steel tubes using equipment for preparing the strip material which is arranged along a strip material preparing center line or feed line and equipment for finishing the tubes which is arranged along a tube finishing center line or feed line in conjunction with alternately usable equipment for forming tubes having helical seams and for forming tubes having longitudinal seams, comprising arranging the equipment for preparing the strip material so that its longitudinal center line is aligned with the longitudinal center line of the tube finishing equipment and positioning the forming equipment for forming tubes of longitudinal center lines in between the strip preparing and tube finishing equipment in order to form tubes having longitudinal weld seams; and, when tubes with helical seams are to be formed, shifting the strip preparing equipment so that its longitudinal center line is disposed at an angle to the longitudinal center line of the tube finishing equipment, and arranging the tube forming equipment for the helical seam welded tubes between the strip preparing part and the tube finishing part.

6. A method, according to claim 5, wherein the tube forming equipment is carried on a trackway and wherein to change from one forming equipment to the other the forming equipment is moved along the trackway to position the selected equipment between the strip preparing and tube finishing equipment.

References Cited

UNITED STATES PATENTS

| | | | |
|---|---|---|---|
| 3,423,003 | 1/1969 | Fletcher | 228—15 |
| 3,269,632 | 8/1966 | Groves et al. | 228—15 |
| 2,752,873 | 7/1956 | Freeze | 228—17 X |

JOHN F. CAMPBELL, Primary Examiner

R. J. CRAIG, Assistant Examiner

U.S. Cl. X.R.

29—33 D, 477, 477.3; 219—59, 62; 228—15, 17